US009264952B2

(12) United States Patent
Zhu et al.

(10) Patent No.: US 9,264,952 B2
(45) Date of Patent: Feb. 16, 2016

(54) METHOD FOR CONFIGURING A NEIGHBORING BASE STATION AND MICRO BASE STATION

(71) Applicant: Huawei Technologies Co., Ltd., Shenzhen, Guangdong (CN)

(72) Inventors: Wei Zhu, Shenzhen (CN); Jian Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 14/196,788

(22) Filed: Mar. 4, 2014

(65) Prior Publication Data

US 2014/0185588 A1 Jul. 3, 2014

Related U.S. Application Data

(63) Continuation of application No. PCT/CN2012/077275, filed on Jun. 21, 2012.

(30) Foreign Application Priority Data

Sep. 6, 2011 (CN) .......................... 2011 1 0261761

(51) Int. Cl.
*H04L 1/00* (2006.01)
*H04W 36/00* (2009.01)
*H04W 24/02* (2009.01)

(52) U.S. Cl.
CPC .......... *H04W 36/0061* (2013.01); *H04W 24/02* (2013.01)

(58) Field of Classification Search
CPC ..... H04W 80/04; H04W 80/05; H04W 80/06; H04W 80/07; H04W 80/08; H04W 72/04; H04W 72/05; H04W 72/06; H04W 36/30; H04W 36/31
USPC ........ 370/328–332; 455/436, 444, 443, 422.1
See application file for complete search history.

(56) References Cited

U.S. PATENT DOCUMENTS

| 2007/0097938 | A1* | 5/2007 | Nylander et al. ............. 370/338 |
| 2010/0087203 | A1 | 4/2010 | Lee et al. |
| 2010/0184439 | A1 | 7/2010 | Chen et al. |
| 2011/0250890 | A1 | 10/2011 | Chen |

FOREIGN PATENT DOCUMENTS

| CN | 101321355 A | 12/2008 |
| CN | 101389125 A | 3/2009 |

(Continued)

*Primary Examiner* — Dady Chery
(74) *Attorney, Agent, or Firm* — Leydig, Voit & Mayer, Ltd.

(57) ABSTRACT

Provided in the embodiments of the present invention are a method for configuring a neighboring base station and a micro base station, realizing that the micro base station detects information of at least one macro base station nearby and sends the information of the macro base station to a core network device, so that the core network device queries information of other base station(s) adjacent to the macro base station, and sends the information of the other base station(s) to the micro base station to enable the micro base station to configure the other base station(s) as neighboring base station(s) of the micro base station, thus solving the technical problem of a call drop of a terminal during a cell handover caused as the micro base station does not configure the neighboring base station(s).

8 Claims, 3 Drawing Sheets

(56) References Cited

FOREIGN PATENT DOCUMENTS

| CN | 101400087 A | 4/2009 |
|---|---|---|
| CN | 101448268 A | 6/2009 |
| CN | 101720100 A | 6/2010 |
| CN | 101765056 A | 6/2010 |
| EP | 2173123 A1 | 4/2010 |
| EP | 2214434 A1 | 4/2010 |

* cited by examiner

METHOD FOR CONFIGURING A NEIGHBORING BASE STATION AND MICRO BASE STATION

CROSS-REFERENCE TO RELATED APPLICATIONS

This application is a continuation of International Patent Application No. PCT/CN2012/077275, filed on Jun. 21, 2012, which claims priority to Chinese Patent Application No. 201110261761.9, filed on Sep. 6, 2011, both of which are hereby incorporated by reference in their entireties.

FIELD OF TECHNOLOGY

The present invention relates to the field of communications, in particular to a method for configuring a neighboring base station and a micro base station.

BACKGROUND OF THE INVENTION

A micro base station is a micro-type base station. The micro base station integrates with a downlink receiver, so the micro base station can search macro base stations nearby and automatically configure these macro base stations as its own neighboring base stations. After the micro base station configures its own neighboring base stations and when a User Equipment (User Equipment, UE) is switched from the micro base station to a macro base station, a drop is avoided, so the micro base station configures the neighboring base stations thereof to enable the UE to be switched from the micro base station to the macro base station.

The process that the micro base station configures the macro base stations nearby as its own neighboring base stations is as follows: the micro base station detects the signal intensity of each macro base station nearby, selects a plurality of macro base stations with better signal quality, acquires information, such as Public Land Mobile Network Identities (PLMN ID), Cell Identities (ID), Location Area Identities (LAI) and the like, of the macro base stations by parsing Broadcast Channel (BCH) information of these macro base stations, and configures the macro base stations as the neighboring base stations according to the information. After the micro base station configures the information, if a UE leaves a cell covered by the micro base station, the UE can be automatically switched to a cell covered by a neighboring base station, so that the continuity of service is ensured.

However, the micro base station is often arranged in a weak coverage area of the macro base stations. For example, the micro base station is arranged in a room where signals of macro base stations can not be detected. As shown in FIG. 1, the micro base station is installed indoors close to a window, wherein the window is adjacent to the macro base station A, and a door is adjacent to the macro base station B. The micro base station can detect the macro base station A and configure the macro base station A as a neighboring base station, but can not detect the macro base station B. When a user holding a UE walks from the coverage area of the micro base station to the coverage area of the macro base station B, because the micro base station does not configure the B as the neighboring base station, a call drop is caused.

SUMMARY OF THE INVENTION

Provided in the embodiments of the present invention are a method for configuring a neighboring base station and a micro base station, realizing that, in mobile communications, the micro base station detects the information of at least one macro base station nearby and sends the information of the macro base station to a core network device, so that the core network device queries the information of other base station(s) adjacent to the macro base station and sends the information of the other base station(s) to the micro base station to enable the micro base station to configure the other base station(s) as neighboring base station(s) of the micro base station according to the information of the other base station(s), thus solving the technical problem of a call drop of a terminal during a cell handover caused as the micro base station does not configure the neighboring base station(s).

In order to fulfill the above objective, the embodiments of the present invention adopt the following technical solutions:

In one aspect, provided in the embodiments of the present invention is a method for configuring a neighboring base station, including:

acquiring, by a micro base station, information of at least one macro base station;

sending, by the micro base station, the information of the macro base station to a core network device, so that the core network device queries information of other base station(s) adjacent to the macro base station;

receiving, by the micro base station, the information of the other base station(s) adjacent to the macro base station, sent by the core network device, and configures the other base station(s) as neighboring base station(s) of the micro base station according to the information of the other base station(s).

In another aspect, provided in the embodiments of the present invention is a micro base station, including:

a first processor, used for acquiring information of at least one macro base station;

a sender, used for sending the information of the macro base station to a core network device, so that the core network device queries information of other base station(s) adjacent to the macro base station;

a receiver, used for receiving the information of the other base station(s) adjacent to the macro base station, sent by the core network device;

a second processor, used for configuring the other base station(s) as neighboring base station(s) of the micro base station according to the information of the other base station(s).

According to a technical solution provided by the embodiments of the present invention, compared with the prior art, in mobile communication, a micro base station detects information of at least one macro base station nearby and sends the information of the macro base station to the core network device, so that the core network device queries information of other base station(s) adjacent to the macro base station and sends the information of the other base station(s) to the micro base station, and thus the micro base station can configure the other base station(s) as neighboring base station(s) of the micro base station according to the information of the other base station(s). Therefore, the technical problem of a call drop of a terminal during a cell handover caused as the micro base station does not configure the neighboring base station(s) is solved.

BRIEF DESCRIPTION OF THE DRAWINGS

In order to illustrate the technical solutions in the embodiments of the present invention or the prior art more clearly, brief description will be made below to the drawings required in the embodiments of the present invention or the prior art, and apparently, the drawings described below are some embodiments of the present invention only, and other drawings could be obtained based on these drawings by those of ordinary skill in the art without creative efforts.

DETAILED DESCRIPTION OF THE EMBODIMENTS

Provided in the embodiments of the present invention are a method for configuring a neighboring base station and a micro base station, realizing that, in mobile communications, the micro base station detects information of at least one macro base station nearby and sends the information of the macro base station to a core network device, so that the core network device queries information of other base station(s) adjacent to the macro base station and sends the information of the other base station(s) to the micro base station to enable the micro base station to configure the other base station(s) as neighboring base station(s) of the micro base station according to the information of the other base station(s), thus solving the technical problem of a call drop of a terminal during a cell handover caused as the micro base station configures the neighboring base station(s).

The technical solutions in the embodiments of the present invention will be described clearly and fully below in conjunction with the drawings in the embodiments of the present invention, and apparently, the embodiments described are only part, but not all of embodiments of the present invention. Based on the embodiments of the present invention, all the other embodiments obtained by those of ordinary skill in the art without creative efforts should be included in the protection scope of the present invention.

Embodiment 1

Figure 1:
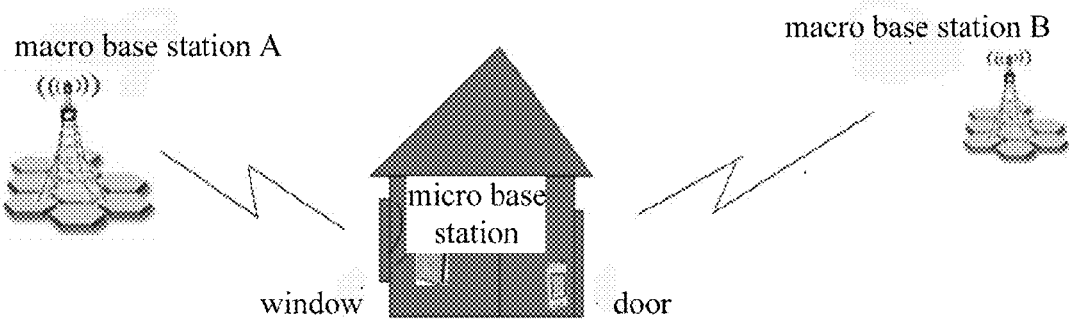
FIG. 1 is a schematic view illustrating networking of a micro base station and macro base stations.
Figure 2:
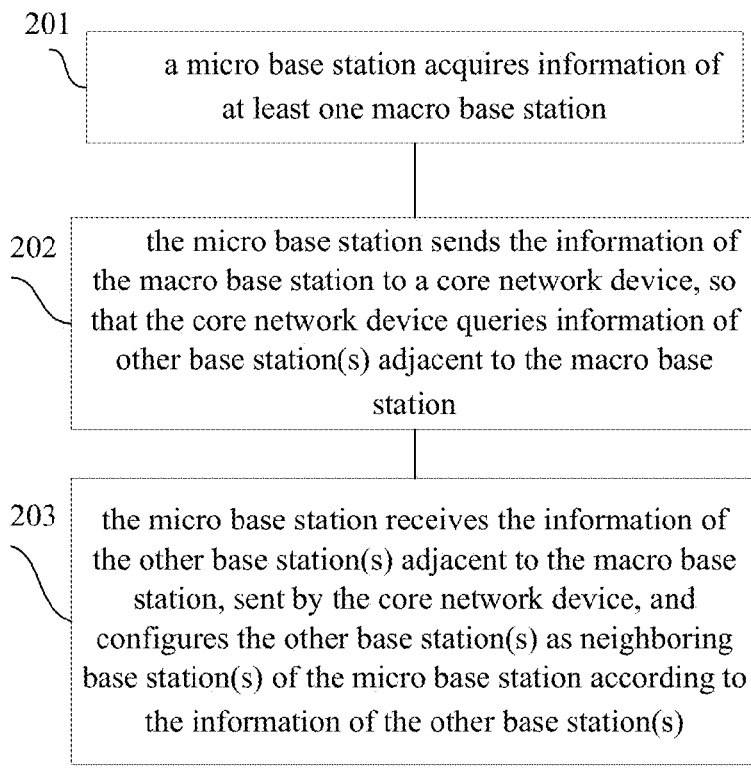
FIG. 2 is a flowchart illustrating method embodiment I provided in the present invention.

Provided in the embodiment of the present invention is a method for configuring a neighboring base station. As shown in FIG. 2, the method includes the following steps:

step 201, a micro base station acquires information of at least one macro base station;

step 202, the micro base station sends the information of the macro base station to a core network device, so that the core network device queries information of other base station(s) adjacent to the macro base station;

step 203, the micro base station receives the information of the other base station(s) adjacent to the macro base station, sent by the core network device, and configures the other base station(s) as neighboring base station(s) of the micro base station according to the information of the other base station(s).

The micro base station may be an Access Point (Access Point, AP), Pico, Epico or Femto. The micro base station is mainly used for providing indoor coverage of a house, an enterprise or a public place.

Figure 3:
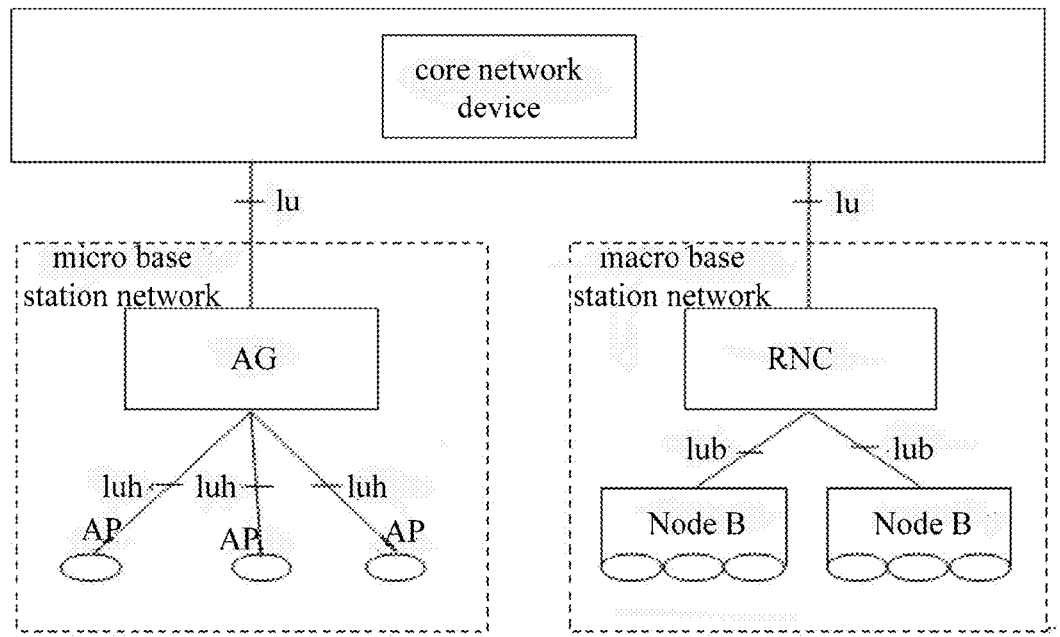
FIG. 3 is a schematic view illustrating a network structural of a method embodiment provided in the present invention.

Supposing that the micro base station is the AP, a network structure of an embodiment of the present invention is shown in FIG. 3, wherein a micro base station network is in the left dashed box, and a macro base station network is in the right dashed box. The AP is connected with an AG (Access Gateway) through an Iuh interface and finally connected to a core network. As shown in FIG. 3, after the AP acquires information of a macro base station nearby, the AP sends the information of the macro base station to the core network device, so that the core network device queries information of other base station(s) adjacent to the macro base station; and after the core network device queries the information of the other base station(s) adjacent to the macro base station, the core network device sends the information of the other base station(s) adjacent to the macro base station to the AP, and the AP configures the other base station(s) as its own neighboring base station(s) according to the information of the other base station(s).

Figure 4:
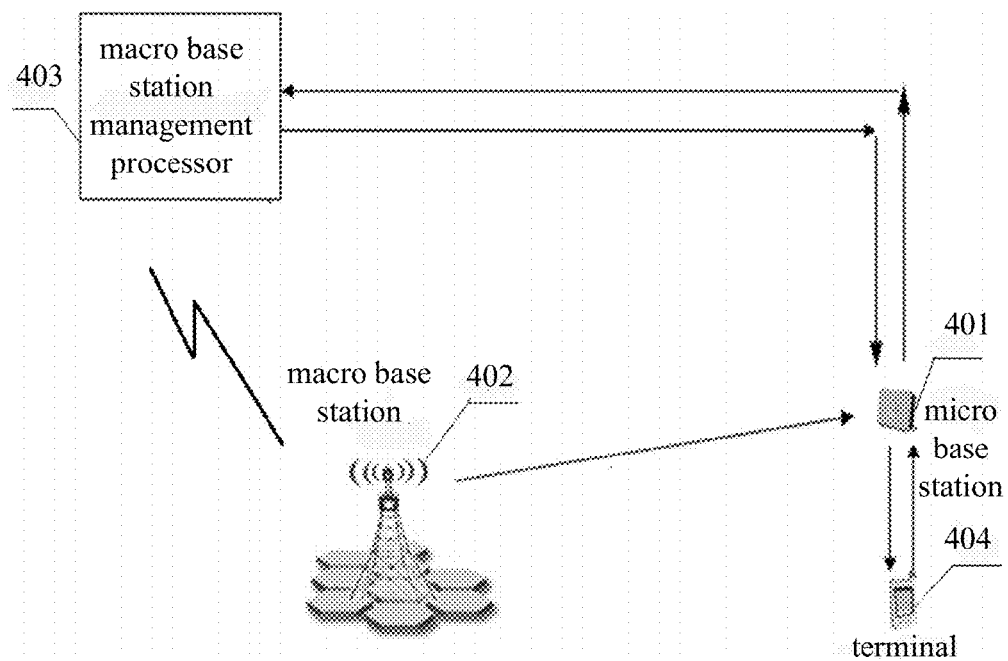
FIG. 4 is schematic view I illustrating a network structural of a method embodiment provided in the present invention.
Figure 5:
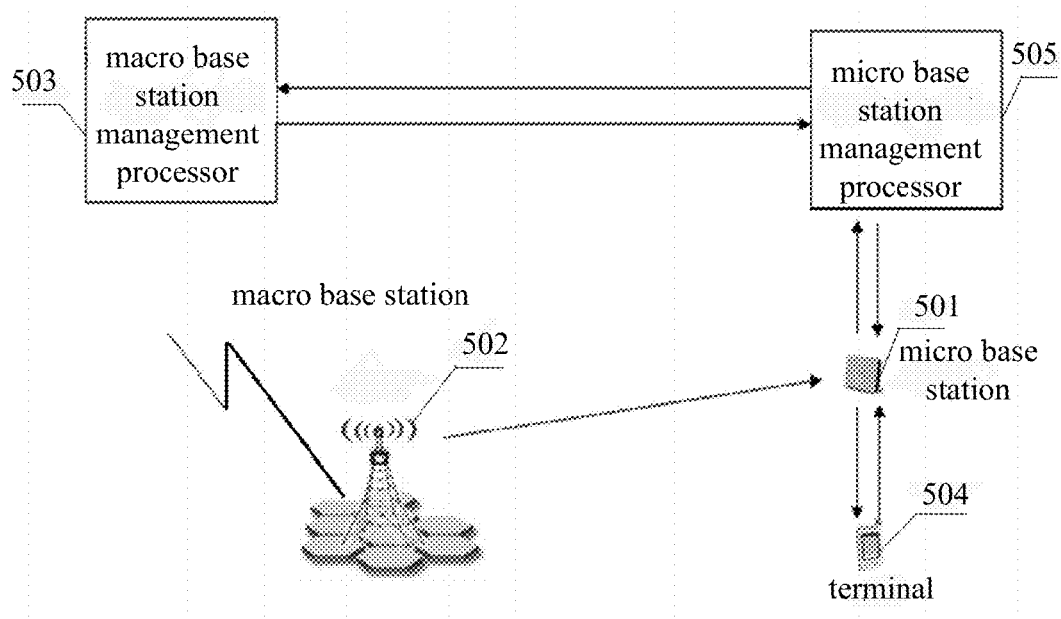
FIG. 5 is schematic view II illustrating a network structural of a method embodiment provided in the present invention.

In actual network application, as shown in FIG. 4, the core network device may be a macro base station management processor; and also as shown in FIG. 5, the core network device may include a macro base station management processor and a micro base station management processor. The method of the present invention will be illustrated below according to the aforementioned two conditions of the core network device respectively.

As shown in FIG. 4, when the core network device only includes the macro base station management processor, all steps of the method are as follow:

a micro base station 401 acquires information of at least one macro base station 402;

the micro base station 401 sends the information of the macro base station 402 to the macro base station management processor 403, so that the macro base station management processor 403 queries information of other base station(s) adjacent to the macro base station 402;

the micro base station 401 receives the information of the other base station(s) adjacent to the macro base station 402, sent by the macro base station management processor 403, and configures the other base station(s) as neighboring base station(s) of the micro base station 401 according to the information of the other base station(s).

Alternatively, in order to reduce the processing time and the processing complexity of the macro base station management processor 403, when the micro base station 401 sends the information of the macro base station 402 to the macro base station management processor 403, the micro base station 401 may only send the information of one macro base station 402 with the best signal quality or a few macro base stations 402 with stronger signals in a plurality of macro base stations 402 to the macro base station management processor 403.

Alternatively, as shown in FIG. 4, before the micro base station 401 configures the other base stations as the neighboring base stations of the micro base station 401 according to the information of the other base stations, the micro base station 401 may send the information of the other base stations to a terminal 404, so that the terminal 404 detects the other base stations according to the information of the other base stations; and the terminal 404 detects these base stations according to the information of the other base stations, sent by the micro base station 401, to determine whether the other base stations indicated by the information of the other base stations sent by the micro base station 401 can be detected by the terminal 404, and reports detection result to the micro base station 401.

The micro base station 401 receives the detection result of the terminal 404, wherein the detection result includes information of base station(s) which can be detected by the terminal 404 of the other base stations; and according to the detection result reported by the terminal 404, the micro base station configures the base station(s) which can be detected by the terminal 404 in the reported detection result as the neighboring base station(s) of the micro base station 401, and does not configure other base station(s) which can not be detected by the terminal 404 as the neighboring base station(s) of the micro base station any more.

Alternatively, as shown in FIG. 4, before the micro base station 401 configures the other base stations as the neighboring base stations of the micro base station according to the information of the other base stations, the micro base station 401 may send the information of the other base stations to a terminal 404, so that the terminal 404 detects the other base stations according to the information of the other base stations; and the terminal 404 detects these base stations according to the information of the other base stations, sent by the micro base station 401, to determine whether the other base stations indicated by the information of the other base stations sent by the micro base station 401 can be detected by the terminal 404, and reports detection result to the micro base station 401.

The micro base station 401 receives the detection result of the terminal 404, wherein the detection result includes information of base station(s) which can not be detected by the terminal 404 of the other base stations; and according to the detection result reported by the terminal 404, the micro base station configures other base station(s) except the base station(s) which can not be detected by the terminal as the neighboring base station(s) of the micro base station.

As shown in FIG. 5, when the core network device includes a macro base station management processor 503 and a micro base station management processor 505, the process that a micro base station 501 sends information of a macro base station 502 to the core network device includes the following specific steps:

the micro base station 501 sends the information of the macro base station 502 to the micro base station management processor 505;

the micro base station management processor 505 forwards the information of the macro base station to the macro base station management processor 503.

The step that the micro base station 501 receives the information of other base station(s) adjacent to the macro base station 502, sent by the core network device includes:

the macro base station management processor 503 sends the information of the other base station(s) adjacent to the macro base station 502 to the micro base station management processor 505; and the micro base station 501 receives the information of the other base station(s) adjacent to the macro base station 502, sent from the micro base station management processor 505.

Therefore, it may be seen from FIG. 5 that, when the core network device includes the macro base station management processor 503 and the micro base station management processor 505, the interaction process of the micro base station 501 and the macro base station management processor 503 may be described as follows:

the micro base station 501 acquires information of at least one macro base station 502; the micro base station 501 sends the information of the macro base station 502 to the micro base station management processor 505, then the micro base station management processor 505 sends the information of the macro base station 502 to the macro base station management processor 503, and the macro base station management processor 503 receives the information of the macro base station 502 and then queries information of other base station(s) adjacent to the macro base station 502; after the macro base station management processor 503 queries the information of the other base station(s) adjacent to the macro base station 502, the macro base station management processor 503 forwards the information of the other base station(s) to the micro base station management processor 505, and the micro base station management processor 505 sends the information of the other base station(s) to the micro base station 501, and the micro base station 501 receives the information of the other base station(s) and then configures the other base station(s) as neighboring base station(s) of the micro base station 501 according to the information of the other base station(s).

Alternatively, after the micro base station management processor 505 receives the information of the macro base station 502, sent by the micro base station 501, the micro base station management processor 505 only sends the received information of one macro base station 502 with the best signal quality or a few macro base stations 502 with better signals of the neighboring macro base stations to the macro base station management processor 503, and in this way, the processing time and the processing complexity of the macro base station management processor 503 are reduced.

Alternatively, after the micro base station 501 acquires the information of the macro base station 502, in order to reduce the processing time and the processing complexity of the macro base station management processor 503, before the information of the macro base station 502 is sent to the micro base station management processor 505, the micro base station 501 sends the information of the macro base station 502 with the best signal quality or the information of a few macro base stations 502 with stronger signals in the at least one macro base station 502 to the micro base station management processor 505, so that the micro base station management processor 505 sends the information of the macro base station with the best signal quality or the information of a few macro base stations 502 with stronger signals to the macro base station management processor 503.

Alternatively, as shown in FIG. 5, before the micro base station 501 configures the other base stations as the neighboring base stations of the micro base station 501 according to the information of the other base stations, the micro base station 501 may send the information of the other base stations to a terminal 504, so that the terminal 504 detects the other base stations according to the information of the other base stations; and the terminal 504 detects these base stations according to the information of the other base stations, sent by the micro base station 501, to determine whether the other base stations indicated by the information of the other base stations sent by the micro base station 501 can be detected by the terminal 504, and reports detection result to the micro base station 501.

The micro base station 501 receives the detection result of the terminal 504, wherein the detection result includes information of base station(s) which can be detected by the terminal 504 of the other base station(s); and according to the detection result reported by the terminal 504, the micro base station continuously configures the base station(s) which can be detected by the terminal 504 in the reported detection result as the neighboring base station(s) of the micro base station 501, and does not configure other base station(s) which can not be detected by the terminal 504 as the neighboring base station(s) of the micro base station any more.

Alternatively, as shown in FIG. 5, before the micro base station 501 configures the other base stations as the neighboring base stations of the micro base station according to the information of the other base stations, the micro base station

501 may send the information of the other base stations to the terminal 504, so that the terminal 504 detects the other base stations according to the information of the other base stations; and the terminal 504 detects these base stations according to the information of the other base stations, sent by the micro base station 501, to determine whether the other base stations indicated by the information of the other base stations sent by the micro base station 501 can be detected by the terminal 504, and reports detection result to the micro base station 501.

The micro base station 501 receives the detection result of the terminal 504, wherein the detection result includes information of base station(s) which can not be detected by the terminal 504 of the other base stations; and according to the detection result reported by the terminal 504, the micro base station configures other base station(s) except the base station(s) which can not be detected by the terminal as the neighboring base station(s) of the micro base station.

Embodiment II

Figure 6:
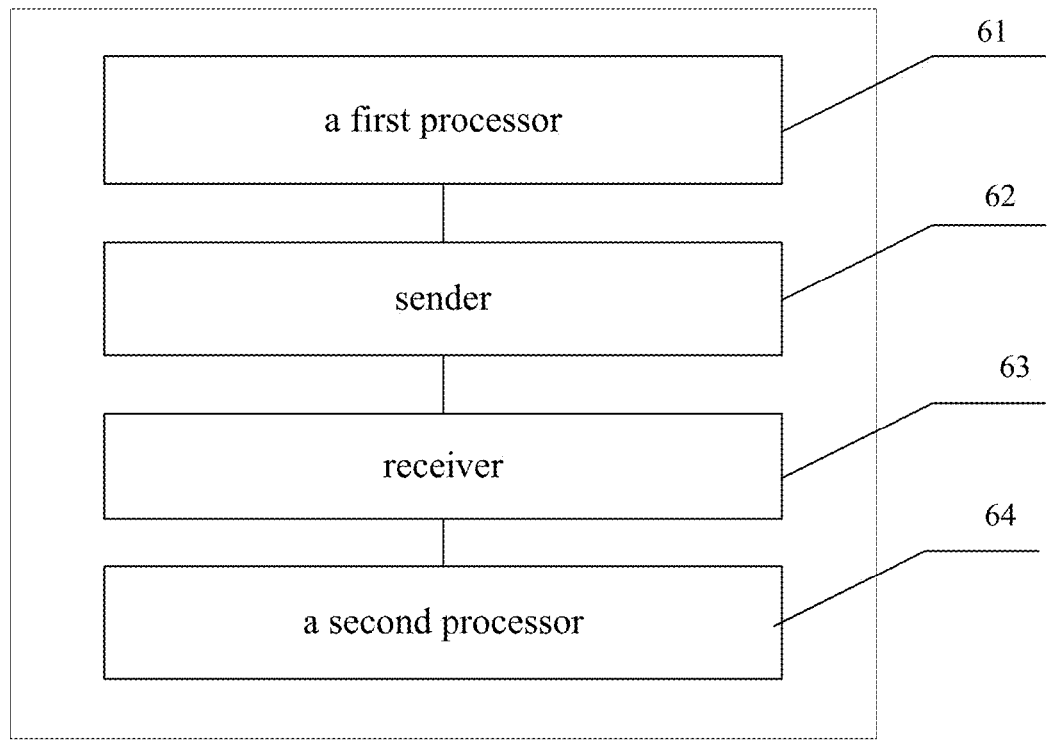
FIG. 6 is a structural schematic view illustrating system embodiment III provided in the present invention.

Provided in an embodiment of the present invention is a micro base station. As shown in FIG. 6, the micro base station includes:

a first processor 61, used for acquiring information of at least one macro base station;

a sender 62, used for sending the information of the macro base station to a core network device, so that the core network device queries information of other base station(s) adjacent to the macro base station;

a receiver 63, used for receiving the information of the other base station(s) adjacent to the macro base station, sent by the core network device, and configuring the other base station(s) as neighboring base station(s) of the micro base station according to the information of the other base station(s);

a second processor 64, used for configuring the other base station(s) as the neighboring base station(s) of the micro base station according to the information of the other base station(s). The sender 62 is used for sending the information of one macro base station with the best signal quality of the at least one macro base station to the core network device.

The core network device includes a macro base station management processor and a micro base station management processor;

the sender 62 is used for sending the information of the macro base station to the micro base station management processor, so that the micro base station management processor forwards the information of the macro base station to the macro base station management processor.

The receiver 63 is specifically used for receiving the information of the other base station(s) adjacent to the macro base station, sent from the micro base station management processor, wherein the information of the other base station(s) adjacent to the macro base station is received from the macro base station management processor by the micro base station management processor.

The sender 62 is specifically used for sending the information of the macro base station with the best signal quality of the at least one macro base station to the micro base station management processor, so that the micro base station management processor sends the information of the macro base station with the best signal quality to the macro base station management processor.

The sender 62 is further used for sending the information of the other base station(s) to a terminal, so that the terminal detects the other base station(s) according to the information of the other base station(s);

the receiver 63 is further used for receiving detection result of the terminal, wherein the detection result includes information of base station(s) which can be detected by the terminal of the other base station(s);

the second processor 64 is specifically used for configuring the base station(s) which can be detected by the terminal as the neighboring base station(s) of the micro base station.

The sender 62 is further used for sending the information of the other base station(s) to the terminal, so that the terminal detects the other base station(s) according to the information of the other base station(s);

the receiver 63 is further used for receiving detection result of the terminal, wherein the detection result includes information of base station(s) which can not be detected by the terminal of the other base station(s);

the second processor 64 is specifically used for configuring other base station(s) except the base station(s) which can not be detected by the terminal as the neighboring base station(s) of the micro base station.

Through the description of the embodiments above, those skilled in the art can clearly understand that the present invention can be realized by means of software and necessary general hardware, of course, can be realized through hardware, but the former is the better implement under many conditions. Based on such understanding, the technical solutions of the present invention substantially or the part making a contribution to the prior art can be reflected in a form of a software product. The computer software product is stored in a readable storage medium such as soft disk, hard disk, optical disk or the like of a computer, and includes a plurality of instructions to enable a computer device (which can be personal computer, server or network device and the like) to execute the method of each embodiment of the present invention.

The description above is only for embodiments of the present invention, but not to limit the protection scope of the present invention. It is easily conceived to those skilled in the art to make alterations or substitutions in these embodiments within the technical scope disclosed by the present invention. It is intended that these alterations or substitutions should be included in the protection scope of the present invention. Therefore, the protection scope of the claims should prevail over the protection scope of the present invention.

What is claimed is:

1. A method for configuring a neighboring base station, comprising:

acquiring, by a micro base station, information of at least one macro base station which is configured as neighboring base station(s) of the micro base station;

sending, by the micro base station, the information of the at least one macro base station to a core network device, so that the core network device queries information of other base station(s) adjacent to the at least one macro base station; and receiving, by the micro base station, the information of the other base station(s) adjacent to the at least one macro base station, sent by the core network device, and configuring the other base station(s) as neighboring base station(s) of the micro base station according to the information of the other base station(s);

wherein the sending, by the micro base station, the information of the at least one macro base station to the core network device comprises:

sending, by the micro base station, the information of one macro base station with best signal quality of the at least one macro base station to the core network device;

wherein the core network device comprises a macro base station management processor and a micro base station management processor, and the sending, by the micro base station, the information of the at least one macro base station to the core network device comprises:

sending, by the micro base station, the information of the at least one macro base station to the micro base station management processor, so that the micro base station management processor forwards the information of the at least one macro base station to the macro base station management processor.

2. The method according to claim 1, wherein the receiving, by the micro base station, the information of the other base station(s) adjacent to the at least one macro base station, sent by the core network device comprises:

receiving, by the micro base station, the information of the other base station(s) adjacent to the at least one macro base station, sent from the micro base station management processor, wherein the information of the other base station(s) adjacent to the at least one macro base station is received by the micro base station management processor from the macro base station management processor.

3. The method according to claim 1, wherein the sending, by the micro base station, the information of the macro base station to the at least one micro base station management processor, so that the micro base station management processor forwards the information of the macro base station to the at least one macro base station management processor comprises:

sending, by the micro base station, the information of the macro base station to the micro base station management processor, so that the at least one micro base station management processor sends the received information of the macro base station with the best signal quality of neighboring macro base station(s) to the at least one macro base station management processor.

4. The method according to claim 1, wherein the sending, by the micro base station, the information of the macro base station to the at least one micro base station management processor, so that the micro base station management processor forwards the information of the macro base station to the at least one macro base station management processor comprises:

sending, by the micro base station, the information of the at least one macro base station with the best signal quality of the at least one macro base station to the micro base station management processor, so that the at least one micro base station management processor sends the information of the macro base station with the best signal quality to the macro base station management processor.

5. The method according to claim 1, wherein before the configuring, by the micro base station, the other base station(s) as the neighboring base station(s) of the micro base station according to the information of the other base station(s), the method further comprises:

sending, by the micro base station, the information of the other base station(s) to a terminal, so that the terminal detects the other base station(s) according to the information of the other base station(s); and receiving, by the micro base station, a detection result of the terminal, wherein the detection result comprises information of base station(s) which can be detected by the terminal of the other base station(s);

wherein the configuring, by the micro base station, the other base station(s) as the neighboring base station(s) of the micro base station according to the information of the other base station(s) comprises:

configuring, by the micro base station, the base station(s) which can be detected by the terminal as the neighboring base station(s) of the micro base station.

6. A micro base station, comprising:

a first processor, used for acquiring information of at least one macro base station which is configured as neighboring base station(s) of the micro base station;

a sender, used for sending the information of the at least one macro base station to a core network device, so that the core network device queries the information of other base station(s) adjacent to the at least one macro base station;

a receiver, used for receiving the information of the other base station(s) adjacent to the at least one macro base station, sent by the core network device; and a second processor, used for configuring the other base station(s) as neighboring base station(s) of the micro base station according to the information of the other base station(s);

wherein the sender is used for sending the information of one macro base station with best signal quality of the at least one macro base station to the core network device;

wherein the core network device comprises a macro base station management processor and a micro base station management processor; and the sender is used for sending the information of the at least one macro base station to the micro base station management processor, so that the micro base station management processor forwards the information of the at least one macro base station to the macro base station management processor.

7. The micro base station according to claim 6, wherein the receiver is configured to receive the information of the other base station(s) adjacent to the macro base station, sent from the at least one micro base station management processor, wherein the information of the other base station(s) adjacent to the at least one macro base station is received from the macro base station management processor by the micro base station management processor.

8. The micro base station according to claim 6, wherein the sender is further ~ to send the information of the other base station(s) to a terminal, so that the terminal detects the other base station(s) according to the information of the other base station(s);

the receiver is further configured to receive a detection result of the terminal, wherein the detection result comprises information of base station(s) which can be detected by the terminal of the other base station(s); and the second processor is specifically used for configuring configures the base station(s) which can be detected by the terminal as the neighboring base station(s) of the micro base station.

* * * * *

UNITED STATES PATENT AND TRADEMARK OFFICE
CERTIFICATE OF CORRECTION

| | | |
|---|---|---|
| PATENT NO. | : 9,264,952 B2 | Page 1 of 1 |
| APPLICATION NO. | : 14/196788 | |
| DATED | : February 16, 2016 | |
| INVENTOR(S) | : Zhu et al. | |

It is certified that error appears in the above-identified patent and that said Letters Patent is hereby corrected as shown below:

In the claims,

Column 10, line 51, "further ~ to send" should read -- further to send --.

Column 10, line 59, "is specifically used for configuring" should be deleted.

Signed and Sealed this
Thirty-first Day of May, 2016

Michelle K. Lee
*Director of the United States Patent and Trademark Office*